United States Patent [19]

Bergman

[11] Patent Number: 5,581,380
[45] Date of Patent: Dec. 3, 1996

[54] TRANSPARENT-SCATTERING DISPLAY DEVICE

[75] Inventor: Anthonie H. Bergman, Eindhoven, Netherlands

[73] Assignee: U.S. Philips Corporation, New York, N.Y.

[21] Appl. No.: 302,568

[22] Filed: Sep. 8, 1994

[30] Foreign Application Priority Data

Sep. 8, 1993 [BE] Belgium ............... 09300940

[51] Int. Cl.⁶ ............... G02F 1/1333; G02F 1/1335
[52] U.S. Cl. ............... 349/63; 349/86; 349/49; 349/110; 349/113; 349/138; 349/162
[58] Field of Search ............... 359/48, 67, 49, 359/50, 51, 58, 60, 74, 79, 70; 362/31

[56] References Cited

U.S. PATENT DOCUMENTS

| | | |
|---|---|---|
| 4,626,074 | 12/1986 | Crossland et al. ............... 359/50 |
| 4,668,049 | 5/1987 | Canter et al. ............... 359/50 |
| 4,989,956 | 2/1991 | Wu et al. ............... 359/50 |
| 5,099,343 | 3/1992 | Margerum et al. ............... 359/48 |

*Primary Examiner*—Anita Pellman Gross
*Assistant Examiner*—Tai V. Duong
*Attorney, Agent, or Firm*—Michael E. Schmitt

[57] ABSTRACT

A display device (1) has a display panel (2) which comprises a first substrate (6) on which a first picture electrode (11–27) is provided as well as a substantially parallel second substrate (7) on which a second picture electrode (20) is provided, both substrates (6, 7) sandwiching an electro-optical medium (8). Said electro-optical medium (8) is capable of switching between an at least substantially transparent state and a scattering state under the influence of an electric field. A transparent insulating layer (10) is provided between the first picture electrode (11–17) and the electro-optical medium (8), said insulating layer reflecting the light (30) which, at least during operation, is emitted by a light source (3) and sidelong captured by the panel (2), so that it does not reach the first picture electrode (11–17).

16 Claims, 2 Drawing Sheets

TRANSPARENT-SCATTERING DISPLAY DEVICE

BACKGROUND OF THE INVENTION

The invention relates to a display device having a display panel comprising a first substrate provided with a first picture electrode and a second substrate provided with a second picture electrode, both electrodes overlapping at least partly and both substrates sandwiching an electro-optical medium at least at the location of the overlap between both picture electrodes, said electro-optical medium being capable of switching between an at least substantially transparent state and a scattering state under the influence of an electric field, and said display device comprising a light source which sidelong illuminates the display panel at least during operation.

The electro-optical medium is generally formed by a layer comprising a liquid-crystalline material, in which case such a device is commonly referred to as LCD which is the abbreviation for Liquid Crystal Display.

The invention particularly, although not exclusively, relates to a display device in which the electro-optical medium is formed by a combined system of a birefringent liquid-crystalline material and a suitable polymer, and said liquid-crystalline material may be dispersed in a polymer matrix, for example, in the form of droplets. An electro-optical medium of this type is generally referred to as PDLC, which is the abbreviation for Polymer Dispersed Liquid Crystal.

In the absence of an electric field, the birefringent droplets in such a medium are randomly oriented and incident light will be randomly scattered at the interface between the droplets and the polymer matrix and between the droplets themselves. Under the influence of an electric field, however, the droplets are oriented in conformity with the electrical lines of force, so that incident light has a uniform refractive index in the liquid-crystalline material. By a suitable choice of the liquid-crystalline material on the one hand and the polymer material on the other hand, it can be achieved that this uniform refractive index substantially corresponds to the refractive index of the polymer matrix, so that scattering occurs neither at the interface between the polymer matrix and the droplets nor between neighbouring droplets, as a result of which the system is transparent to incident light. Thus, the electro-optical medium is capable of switching between a scattering state and a substantially transparent state under the influence of an electric field.

A device of the type mentioned in the opening paragraph is known from U.S. Pat. No. 5,099,343. In said known device the display panel comprises two substrates in the form of flat plates of glass or a suitable transparent synthetic resin, siad plates sandwiching, over substantially their entire surface, an electro-optical medium in the form of a layer of PDLC material.

In the known device, a light source in the form of an elongated fluorescent lamp is arranged at the side of the display panel and illuminates the whole side of the panel. The emitted light is captured by the display panel and can propagate through the panel by means of internal reflection. The light is reflected at the outer surfaces, i.e. the sides facing away from the PDLC layer, of both transparent plates.

The inner surface of both plates, which are in contact with the PDLC material, are provided with a picture electrode and the electrodes overlap. The overlap between the two picture electrodes determines the location of a picture element where the liquid-crystalline material can switch between both states under the influence of an electric field which is applied between said two picture electrodes. In the scattering state, light will be emitted at the location of the picture element, so that an observer sees the picture element luminesce. However, if the liquid-crystalline material is transparent at the location of the picture element, the light remains confined in the device and, hence, no light is emitted at the location of the picture element. In this case, an observer sees through the picture element and sees the (dark) background of the display panel.

In the known device, both picture electrodes must be substantially transparent to ensure that the light captured is not hindered. For this reason, indium-tin oxide (ITO), which is at least substantially transparent to visible light, is used for both picture electrodes.

Indium-tin oxide is electrically conductive, but its resistivity is much higher than that of most metals. For example, the sheet resistance of an average conductor track of aluminium typically is less than 0.5 $\Omega/\Box$, which is approximately a factor of 40 smaller than the sheet resistance of approximately 20 $\Omega/\Box$ of an average track of indium-tin oxide. Thus, particularly in the case of relatively long and narrow picture electrodes, ITO leads to a relatively high series resistance and hence to a relatively long RC time, which is an important disadvantage for, in particular, display devices having a relatively large number of picture elements. In addition, in comparison with, for example, many metals, indium-tin oxide is difficult to handle from a technological point of view.

OBJECTS AND SUMMARY OF THE INVENTION

It is an object of the present invention to provide, inter alia, a display device of the type mentioned in the opening paragraph, in which for at least one of the two picture electrodes an electrically, relatively well-conducting material can be used.

Another object of the invention is to provide, inter alia, an active display device of the type mentioned in the opening paragraph, having a larger useful display surface relative to the overall display surface, the so-called aperture ratio, i.e. the ratio between the overall surface area of the picture elements and the surface area of the display panel. In an active device, the picture elements are drive by (active) switching elements, for example, in the form of transistors or diodes which are provided in the vicinity of the picture electrode(s) of one or both substrates. Owing to their sensitivity to light, the switching elements are customarily provided with an opaque coating. However, in a device of the type mentioned in the opening paragraph this leads to a reduction of the aperture ratio because, in this case, a picture element cannot be present at the location of a switching element. In a conventional, active LCD the useful display surface typically is only 40%–50% of the overall surface of the display panel.

The present invention also aims at providing an active device of the type mentioned in the opening paragraph, in which the first picture electrode can be driven via an active switching element, without causing a reduction of the aperture ratio.

In accordance with the present invention, a device of the type mentioned in the opening paragraph is characterized in that a transparent insulating layer is provided between the first picture electrode and the electro-optical medium, said layer having a lower refractive index than the lowest refractive index of the electro-optical medium.

In the device in accordance with the invention, light which is sidelong captured by the display panel is reflected by the insulating layer and can thus propagate through the display panel. Preferable, the light source and the panel are positioned relative to each other in such a manner that at least most of the light captured is captured at an angle $\alpha$ which is smaller than the critical angle $\alpha_c$. If the insulating layer and the electro-optical medium are in direct contact with each other, the critical angle can be defined as:

$$\alpha_c = 90 - \arcsin(n_l/n_i),$$

where $n_l$ is the refractive index of the insulating layer and $n_i$ is the refractive index of the electro-optical medium. If light is captured at a smaller angle, total (internal) reflection from the insulating layer takes place, so that most of the light can effectively be used for display. Since the insulating layer itself is transparent to visible light, ambient light will be able to pass through the insulating layer, at least when the electro-optical medium is in the transparent state. By using a non-reflecting first picture electrode, disturbing reflections of ambient light in the display panel in accordance with the invention can be counteracted, which has a very favourable effect on the picture quality.

By using the insulating intermediate layer it is achieved in the device in accordance with the invention that sidelong captured light is no longer internally reflected between the outer surfaces of both substrates, but instead, as regards the first substrate, is reflected from the reflecting layer. This means that the light captured no longer reaches the first picture electrode and hence said picture electrode no longer has to be transparent.

Therefore, a preferred embodiment of the device in accordance with the invention is characterized in that the first picture electrode comprises an electrically, relatively well-conducting material, such as carbon or a metal-containing material such as aluminium, tungsten, molybdenum or a metal silicide, all of which are relatively frequently used in LCD technology. This enables the series resistance and hence the RC time of the picture element to be substantially reduced as compared to transparent conductive material such as indium-tin oxide in the known device.

A metal-containing material is to be understood to mean within the scope of the invention, any metallic material comprising whatever form of metal, so that both pure metals and metal alloys such as metal compounds are included. Although such materials often are extremely good electrical conductors, they are generally opaque and hence cannot readily be used for the first picture electrode in the known device.

Besides, it is noted that in the above-mentioned U.S. Pat. No. 5,099,343, with reference to FIG. 2, a description is given of a device of the type described in the opening paragraph, in which a metallic layer is used as the first picture electrode which must be reflecting for projection purposes.

As noted hereinabove, this has the disadvantage that it causes also ambient light to be reflected towards the observer, which has a disturbing effect on the image. To preclude this, the known device requires the use of a light-tight shield. By virtue of the invention, the use of such a light-tight shield to preclude said disturbing reflections of ambient light can be abandoned. After all, in accordance with the invention the light is (internally) reflected by the (reflecting) insulating layer which is additionally provided between the first picture electrode and the electro-optical medium. This means that the first picture electrode does not have to be reflective itself and, preferably, is not reflective to avoid disturbing reflections of, in particular, the substantially perpendicularly incident ambient light. In the case of, for example, a light-absorbing or scattering first picture electrode, the ambient light will not or hardly be reflected by the device. The same applied to a transparent first picture electrode behind which an absorbing or scattering layer is arranged.

A particular embodiment of the device in accordance with the invention is characterized in that the first picture electrode comprises an electrically, relatively well-conducting material and is provided with at least a light-absorbing top coating on the side facing the electro-optical medium. Said top coating may be provided completely independently of the first picture electrode and may be manufactured from, for example, a completely different material. However, preferably use is made of a first picture electrode and a top coating which are made of the same metal, in particular a metal selected from the group consisting of chromium, tungsten, molybdenum and tantalum, the top coating having a higher porosity than the metal of the underlying first picture electrode. Light which is incident on the porous top coating is captured in the pores thereof and finally absorbed, so that the top coating has a truly black appearance although the metal itself would normally be shiny.

By so constructing the picture electrode in its entirety or only the top coating, and by giving it a black appearance, the picture element in the transparent state will appear truly black to the observer. This lead to a great contrast with the scattering state in which light is emitted and the picture element is bright. In contrast to the known device, the provision of a separate black coating on the outer surface of the first substrate can be dispensed with and hence an additional process step is rendered superfluous.

By virtue of the fact that, in accordance with the invention, the captured light is reflected from the insulating layer and no longer from the outer surface of the first substrate, in the device use can be made of an opaque first picture electrode and an opaque substrate and, in addition, the first picture electrode can be driven via an active switching element without causing a reduction of the aperture ratio.

To this end, a particular embodiment of the device in accordance with the invention is characterized in that a switching element is arranged between the first substrate and the first picture electrode, a first main electrode of said switching element being connected to the first picture electrode and a second main electrode of said switching element being connected to a connection conductor. In this case, the first picture electrode overlaps the switching element at least partly and the useful display surface is limited only by the necessary, electrically insulating interspace between the first picture electrode and a possible adjoining picture electrode of a possible adjoining picture element. Thus, the device in accordance with the invention is very suitable for applications requiring a high brightness and/or a high resolution, for example high definition television systems such as HD-MAC and high resolution display for datagraphic applications such as (S)VGA and XVGA display screens. In this connection, the type of switching element used is in principle irrelevant. For example, the switching element may comprise a transistor or may be formed by one or more than one pn-, Zener-, PIN- or thin-film diodes.

More particularly, in accordance with the invention the switching element is at least partly accommodated in a relatively thin layer on the first substrate. This makes it possible to integrate the switching element together with other components of the display panel on the substrate. In the case of a semiconductor switching element, the thin layer comprises, for example, amorphous or polycrystalline silicon and the switching element comprises, for example, a thin-film field effect transistor, a so-called TFT which is the abbreviation for Thin Film Transistor, the source and drain regions of which are accommodated in the thin layer, or the switching element comprises, for example, a pn-, Zener-, or PIN-diode whose anode and cathode are arranged in the thin silicon layer. If a thin-film diode is used for driving purposes, the in layer comprises, for example, a stack made up of, in succession, a metal, an insulator and again a metal.

If a switching element is provided between the first substrate and the first electrode, it is to be preferred in accordance with the invention that both the first picture electrode and the first substrate are opaque. In that case, the switching element which is often sensitive to light, is already shielded against incident light by the substrate and the first electrode, so that no additional coating need be applied to the switching element. Also in this case, the first electrode, at least the top coating, is preferably a black conductor such as modified chromium, tungsten, molybdenum or tantalum to increase the contrast of the display panel.

BRIEF DESCRIPTION OF THE DRAWINGS

The invention will now be explained in greater detail by means of a number of exemplary embodiments and with reference to a drawing, in which.

The Figures are diagrammatic and not drawn to scale. For clarity, some dimensions have been exaggerated strongly. To the extent possible, like reference numerals refer to like parts.

DESCRIPTION OF THE PREFERRED EMBODIMENT

Figure 1:
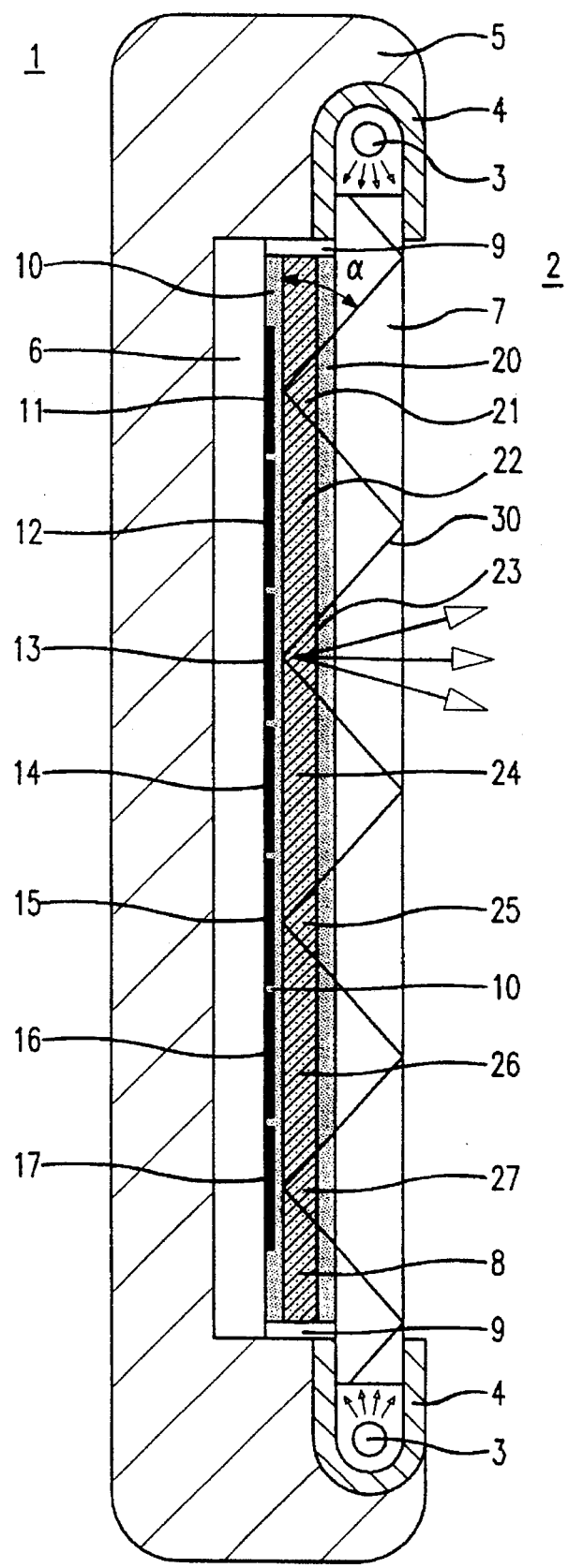
FIG. 1 is a cross-sectional view of a first exemplary embodiment of the device in accordance with the invention.

FIG. 1 shows a first exemplary embodiment of a display device in accordance with the invention. A device 1 comprises a display panel 2 which is illuminated by a sidelong arranged light source 3. A hollow reflector 4 is arranged behind the light source 3 to reflect the light emitted rearwards by the light source back to the display panel. For the light source 3 use can be made of any type of lighting element which can suitably illuminate a whole side of the panel in a preferably homogeneous manner, such as a thin, elongated fluorescent lamp. Particularly in the case of relatively large display panels it is to be preferred to arrange such a light source on either side of the panel or, as in the present example, to provide the panel with a meander lamp (3) which surrounds said panel. The different parts 2, 3, 4 are located in or at a diagrammatically shown housing 5.

The display panel comprises a first substrate 6 in the form of a substantially flat plate of glass, quartz or a suitable transparent synthetic resin on which a number of first picture electrodes 11–17 are arranged in a side-by-side relationship. The panel further comprises a second substrate 7 which is arranged at least substantially parallel to the first substrate 6 and which, like said first substrate, comprises a substantially flat plate of glass, quartz or a suitable transparent synthetic resin on which a transparent second picture electrode 20 is provided. Said second picture electrode 20 comprises indium-tin oxide or another suitable transparent conductor and forms part of a plurality of such second picture electrodes which are arranged in a side-by-side relationship and demonstrate an overlap with the first picture electrodes 11–17.

Both substrates 6, 7 are arranged at a fixed distance from each other by regularly placed spacers 9 and sandwich, over substantially their entire surface, an electro-optical medium 8 which, in this example, is formed by a so-called PDLC layer, which is the abbreviation of Polymer Dispersed Liquid Crystal. The PDLC layer 8 comprises a matrix of a suitable polymer, such as a polyacrylate, in which a liquid-crystalline material in the form of spherical or ellipsoidal droplets is dispersed. The liquid-crystalline material is birefringent with a refractive index of approximately 1.5 transverse to the director and a refractive index of approximately 1.7 parallel thereto. Up to approximately 80% of the layer 8 consists of this material which is commercially available.

The PDLC layer 8 is capable of switching between an at least substantially transparent state and a scattering state under the influence of an electric field. By means of the first and second picture electrodes 11–17, 20 such a field can be locally applied at the location of the overlap, thereby forming a system of separate picture elements 21–27.

In the absence of an electric field between a first picture electrode 11–17 and a second picture electrode 20, the birefringent LC droplets are randomly oriented and incident light will be randomly scattered at the interface between the droplets and the polymer matrix. In this case, light will be emitted at the location of a picture element which is associated with the relevant electrode, as is diagrammatically shown in the drawing for the picture element 23 between one of the first picture electrodes 13 and the second picture electrode 20. In that case, an observer will see the relevant picture element 23 luminesce.

Conversely, under the influence of an electric field between a first picture electrode 11–17 and a second picture electrode 20 the droplets in an associated picture element are oriented in conformity with the electrical lines of force, so that light which is incident on the liquid-crystalline material has a uniform refractive index. The PDLC layer 8 is so selected that this refractive index corresponds substantially to the refractive index of the polymer matrix so that scattering will occur neither at the interface between the LC droplets and the polymer matrix nor between neighbouring LC droplets, so that the picture element is at least substantially transparent to incident light. Consequently, no light is emitted at the location of the picture element. In this case, at the location of the picture element an observer will look right through the medium 8 as is the case with six (21–22, 24–27) out of seven picture elements shown, and sees the background thereof.

In accordance with the invention, an insulating layer 10 having a lower refractive index than the lowest refractive index of the electro-optical medium 8 is provided between the first picture electrodes 11–17 and the PDLC layer 8. In the present example, the insulating layer comprises aluminium fluoride ($AlF_3$) having a refractive index of approximately 1.35. This refractive index is much lower than the lowest refractive index of the PDLC layer 8, which is 1.5. To avoid an excessive increase of the drive voltage of the picture elements, the insulating layer 10 is applied in a small thickness.

Light which is sidelong captured by the panel is (internally) reflected at the interface between the PDLC layer 8 and the insulating layer 10, whereafter it propagates through the device. In particular if the light source and the display panel are so arranged relative to each other that most of the light is incident on the interface at an angle $\alpha$ which is smaller than the critical angle $\alpha_c$, total reflection even takes place, so that absolutely no light reaches the first picture electrodes 11–17 and the underlying first substrate 6. The light is similarly reflected at the interface between the second substrate 7 and the ambient (air). Thus, the light remains captured between both interfaces. This light path 30 is diagrammatically shown in the drawing. The critical angle $\alpha_c$ can generally be defined as:

$$\alpha_c = 90 - \arcsin(n_t/n_i),$$

where $n_t$ is the refractive index of the insulating layer 10 and $n_i$ is the refractive index of the electro-optical medium 8, so that, in this example the value can be calculated to be $$\alpha_c = 90 - \arcsin(1.35/1.5) \approx 26°.$$

Since, by virtue of the invention, the first picture electrodes 11–17 are not situated in the light path 30, said first picture electrodes 11–17 need not be transparent. Thus, for the first picture electrodes 11–17 no use has to be made of a transparent conductor such as ITO which, although it is electrically conductive, has a relatively high resistivity as compared to at least most other metal-containing materials. The same applies to other transparent conductors, such as antimony-tin oxide (ATO) and tin oxide. Besides, from a technological point of view, ITO is relatively difficult to handle as compared to many metals. Accordingly, in the present exemplary embodiment an opaque yet electrically relatively well-conducting material is advantageously used for the first picture electrodes 11–17. In this example, the first picture electrodes comprise chromium and the sides of the picture electrodes facing the PDLC layer 8 are provided with a light-absorbing top coating which also comprises chromium but whose porosity is much greater than that of the underlying picture electrode. For clarity, said top coating is not separately shown in the drawing.

Such a buildup can be realised in a simple manner by applying the metal layer from which the first picture electrode is formed by sputtering and, when the desired thickness has been attained, increasing the sputtering pressure, i.e. the pressure of the atmosphere in which sputtering is carried out and which comprises, for example argon, by for example approximately a factor of ten. In practice it has been found that in this case the growth of the metal layer continues with a substantially increased porosity, so that ultimately the metal layer is covered with the desired, porous, light-absorbing top coating. If desired, the porosity and hence the light-absorbing power of the top coating can be further increased by slightly etching the top coating and, if necessary, oxidizing it at least partially. In this manner a porosity in excess of 50% and a reflection coefficient below 5% of the top coating can be attained, while the electrical conductance of the electrode is preserved.

Light which is incident on the top coating is captured in the pores, which may occupy more than 50% of said coating, and is finally absorbed. As a result, the top coating has a completely black appearance, thereby avoiding disturbing reflections of, in particular, the substantially perpendicularly incident ambient light. Instead of chromium, use can be made of, for example, molybdenum, tantalum and tungsten, which can be used in a similar manner.

Due to the completely black appearance of the picture electrodes 11–17, an observer sees a truly black background at the location of the transparent picture elements. This results in an increased contrast relative to the scattering, and hence bright, picture elements 23. By virtue thereof, an additional black coating on the rear side of the display panel, as in the known device, as well as the required process step(s) can be dispensed with.

In the present exemplary embodiment, the invention thus provides a display device of the type mentioned in the opening paragraph, which has an extremely good electrical conductance of the first picture electrodes, so that the RC times thereof are also acceptable for display panels having relatively many picture elements, and which has a high contrast between the picture elements.

Figure 2:
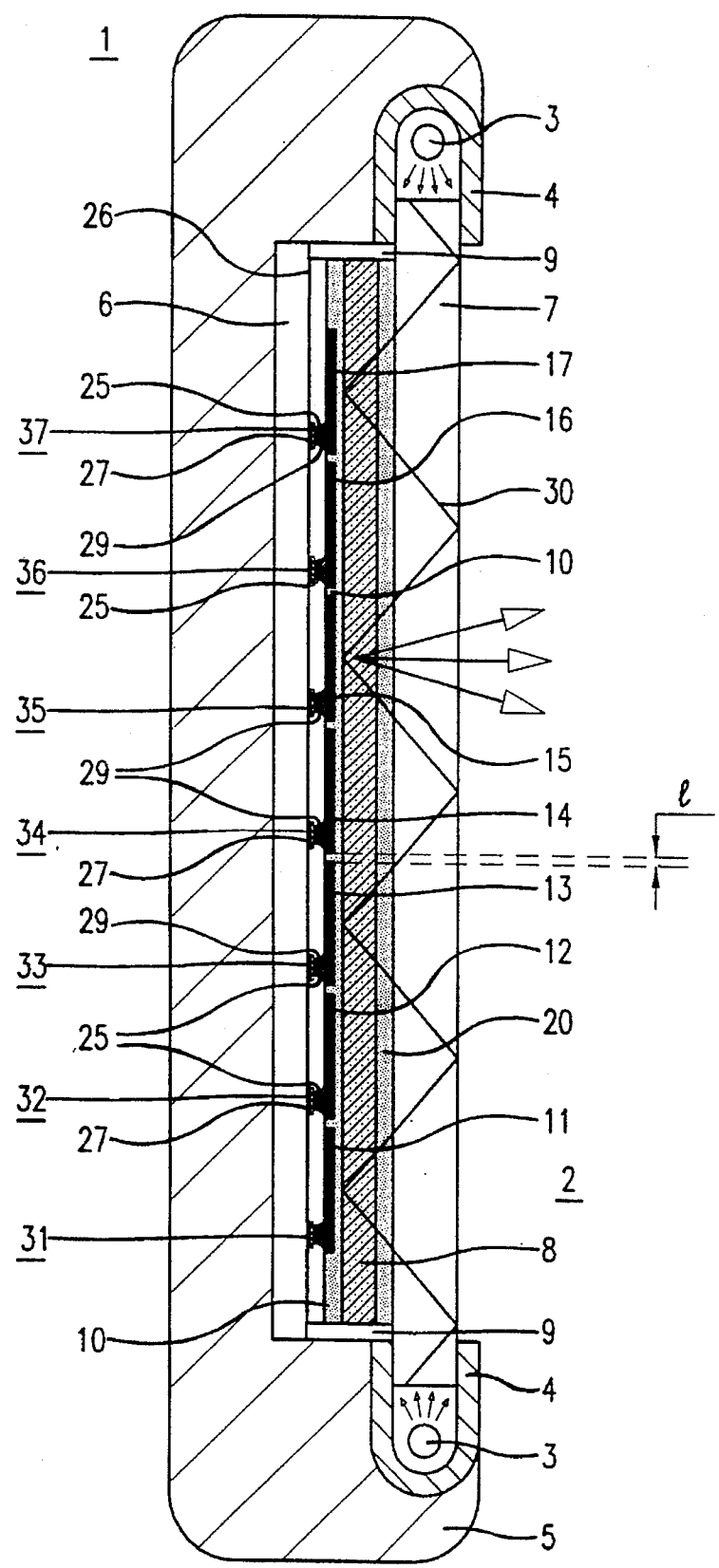
FIG. 2 is a cross-sectional view of a second exemplary embodiment of the device in accordance with the invention, in which a display element is driven via a switching element.

A second exemplary embodiment of the device 1 in accordance with the invention is shown in FIG. 2. As in the preceding example, the device comprises a display panel 2 which is sidelong illuminated by a light source 3 and a reflector 4, said display panel having a first and a second substrate 6 and 7, respectively, in the form of two substantially flat, parallel plates of glass, quartz or a suitable synthetic resin, sandwiching, over substantially their entire surface, an electro-optical medium 8 in the form of a PDLC layer, said plates being held at a specific distance from each other by spacers 9. The material of the PDLC layer and the refractive indices thereof correspond to those of the preceding exemplary embodiment. As in the preceding example, the device further comprises a number of juxtaposed first picture electrodes 11–17 which are provided on the first substrate as well as a number of transparent second picture electrodes 20, made of indium-tin oxide or another suitable transparent conductor, which are located on the second substrate 7 and which demonstrate an overlap with the first picture electrodes 11–17. Thus, the device comprises a system of picture elements which are situated at the location of the overlapping portions of, on the one hand, the first picture electrodes 11–17 and, on the other hand, the second picture electrodes 20. As in the preceding example, the assembly is accommodated in a suitable housing 5.

In the present example, the picture elements are driven directly or indirectly via active switching elements 31–37 which are arranged between the first picture electrodes 11–17 and the associated connection conductors and which, in the present example, are formed by thin-film diodes, each having a first main electrode 25 and a second main electrode 27 of tantalum which are separated from each other by a comparatively thin insulating layer 26 of tantalum oxide. The connection conductors are made of the same conductive layer as the two main electrodes 27 of the diodes 31–37, but they are located outside the plane of the drawing. It is alternatively possible to use other metals and insulating materials for the main electrodes 25, 27 and the insulating layer 26. The switching elements 31–37 can be integrated on the first substrate 6 in a simple manner by using three relatively thin layers, of the order of 50 nm, for the switching elements 31–37 and, if desired, said layers can be conventionally provided in accordance with a pattern in a single process step.

With a view to a flat base for the first picture electrodes 11–17, the diodes 31–37 are covered with a comparatively thick planarizing and passivating layer 28 of silicon nitride in which contact windows are provided at the location of the first main electrodes 25 of the switching elements. Said contact windows are filled in with titanium-tungsten 29, a so-called via, to establish an electric connection between the first main electrodes 25 of the switching elements 31–37 and the relevant first picture electrodes 11–17. Each of the second main electrodes 27 of the diodes 31–37 is coupled, outside the plane of the drawing, to the connection conductor associated with the relevant picture element.

Also in this example an insulating layer 10 of aluminium fluoride having a refractive index of approximately 1.35, which is situated between the first picture electrodes 11–17 and the PDLC layer 8, ensures that the light path 30 can hardly, if at all, extend beyond said insulating layer. By virtue thereof, the often light-sensitive switching elements 31–37 of the captured light can be shielded and the switching elements 31–37 and the first picture electrodes 11–17 can overlap without picture loss, irrespective of whether said picture electrodes are transparent or not. The latter also applies to the connection conductors which are necessary for driving.

Thus, in the present example, the thin-film diodes 31–37, as well as the connection conductors, are situated between the first substrate 6 on the one hand and the first picture electrodes 11–17 on the other hand, so that they are situated outside the light path 30 of the captured light and disturbing influences thereof are counteracted and, in addition, the switching elements 31–37 do not take up any additional space. Thus, in the present exemplary embodiment, the invention provides a display device of the type mentioned in the opening paragraph, in which the picture elements of the display panel 3 are driven via active switching elements 31–37 but the useful display surface, i.e. the ratio between the overall surface area of the picture elements and the overall surface area of the panel, commonly referred to as the aperture ratio, is limited only by the interspace 1 which is necessary for the mutual electrical insulation. By virtue thereof, the aperture ratio, which for conventional, active LCD devices typically amounts to approximately 40%–50%, can increase to approximately 80–90% in the device in accordance with the invention.

Although it is not necessary for the invention, the first electrodes 11–17 are preferably made of an opaque metal-containing material, as in the preceding example. Also in this case conductor tracks of chromium are chosen which are coated with a thin layer of black chromium oxide on the side facing the PDLC layer. In the present example, an opaque first picture electrode has the advantage, as compared to conventional transparent conductors such as ITO, of a relatively low resistivity and hence a short RC time and a high contrast, and it offers the additional advantage that the often light-sensitive switching elements 31–37 are effectively shielded from light which is incident from the front side. At the rear side this function is performed by two main electrodes 25 and 27 of the diodes 31–37. If the shielding at the rear side is insufficient, preferably, an opaque first substrate 6, i.e. a first substrate 6 of an opaque material or a first substrate 6 provided with an opaque coating, is used in addition to opaque first picture electrodes 11–17.

It will be obvious that although the invention has been explained by means of only two exemplary embodiments, it is intended that the invention not be limited to said examples. Many variations and embodiments are possible to those skilled in the art without departing from the scope of the invention.

For example, in both exemplary embodiments use is made of a PDLC layer as the electro-optical medium. However, within the scope of the invention other electro-optical media can alternatively be used provided that they can switch between a scattering state and an at least substantially transparent state under the influence of an electric field. Apart from a PDLC layer or a closely related, so-called NCAP layer, which is the abbreviation for Nematic Curvilinear Aligned Phase, other combined systems of a polymer and a liquid-crystalline material, such as a polymer network liquid crystal (PNLC) and an anisotropic (scattering) gel, or, for example, a dynamically scattering layer of purely liquid-crystalline material can alternatively be used. In both cases the scattering effect is greater as the difference between the highest and the lowest refractive index of the LC material used is greater, so that a higher brightness is obtained and/or the thickness of the LC layer and hence the drive voltage thereof can be smaller.

Further, if desired a suitable dye can be added to the electro-optical medium to increase, for example, the contrast of the display panel and a colour other than black can be used for the light-absorbing top coating on the first picture electrodes.

For the insulating layer use can be made of insulating materials other than aluminium fluoride, provided that the insulating constant of the material is lower than the (lowest) insulating constant of the electro-optical medium. In the PDLC layer which is used as an electro-optical medium in the examples, it is alternatively possible to use silicon oxide having a refractive index of approximately 1.45 or TEFLON® having a refractive index of approximately 1.33. The range of materials which can be used for the insulating layer is greater as the (lowest) refractive index of the electro-optical medium used is higher. Besides, for the insulating layer use can be made of a stack of layers, which do not have to be individually insulating, to optimize the optical properties thereof.

In addition, the second substrate can be provided with complementary colour filters in a conventional manner, thereby making the device suitable for colour display.

I claim:

1. A display device having a display panel comprising a first substrate provided with a first picture electrode and a second substrate provided with a second picture electrode, both electrodes overlapping at least partly and both substrates sandwiching an electro-optical medium at least at the location of the overlap between both picture electrodes, said electro-optical medium being capable of switching between an at least substantially transparent state and a scattering state under the influence of an electric field, and said device comprising a light source which, at least during operation, sidelong illuminates the display panel, characterized in that an insulating layer is provided between the first picture electrode and the electro-optical medium, said insulating layer being at least substantially transparent and having a lower refractive index than the lower refractive index of the electro-optical medium.

2. A display device as claimed in claim 1, characterized in that the first picture electrode comprises an electrically, relatively well-conducting material.

3. A display device as claimed in claim 1, characterized in that the first picture electrode is provided with at least a light-absorbing top coating on the side facing the electro-optical medium.

4. A display device as claimed in claim 3, characterized in that the first picture electrode and the top coating both comprise the same metal, the top coating having a higher porosity than the first picture electrode.

5. A display device as claimed in claim 4, characterized in that the top coating is at least partially oxidized.

6. A display device as claimed in claim 4, characterized in that the metal is selected from a group consisting of chromium, tungsten, molybdenum and tantalum.

7. A display device as claimed in claim 1, characterized in that a switching element is arranged between the first substrate and the first picture electrode, a first main electrode of said switching element being connected to the first picture electrode and a second main electrode being coupled to a connection conductor.

8. A display device as claimed in claim 7, characterized in that the switching element is at least partly accommodated in a relatively thin layer on the first substrate.

9. A display device as claimed in claim 7, characterized in that both the first picture electrode and the first substrate are opaque.

10. A display device as claimed in claim 1, characterized in that the electro-optical medium is formed by a layer which is sandwiched by both substrates and which comprises a polymer matrix in which a birefringent liquid-crystalline material is dispersed.

11. A display device as claimed in claim 10, characterized in that the insulating layer has a lower refractive index than the lowest refractive index of the liquid-crystalline material.

12. A display device as claimed in claim 2, characterized in that the first picture electrode is provided with at least a light-absorbing top coating on the side facing the electro-optical medium.

13. A display device as claimed in claim 5, characterized in that the metal is selected from a group consisting of chromium, tungsten, molybdenum and tantalum.

14. A display device as claimed in claim 6, characterized in that the metal is chromium.

15. A display device as claimed in claim 13, characterized in that the metal is chromium.

16. A display device as claimed in claim 8, characterized in that both the first picture electrode and the first substrate are opaque.

* * * * *